United States Patent
Hashimoto et al.

(10) Patent No.: US 7,528,901 B2
(45) Date of Patent: May 5, 2009

(54) BACKLIGHT DEVICE, LIQUID CRYSTAL DISPLAY DEVICE, AND ELECTRONIC APPARATUS USING LIQUID CRYSTAL DISPLAY DEVICE

(75) Inventors: Kazuo Hashimoto, Kanagawa (JP); Shouta Takezawa, Saitama (JP); Kouichiro Takashima, Tokyo (JP)

(73) Assignee: Sony Corporation (JP)

( * ) Notice: Subject to any disclaimer, the term of this patent is extended or adjusted under 35 U.S.C. 154(b) by 13 days.

(21) Appl. No.: 11/809,687

(22) Filed: May 31, 2007

(65) Prior Publication Data

US 2007/0279550 A1 Dec. 6, 2007

(30) Foreign Application Priority Data

Jun. 2, 2006 (JP) ............................ P2006-154529

(51) Int. Cl.
*G02F 1/1335* (2006.01)
(52) U.S. Cl. ............................ 349/65; 349/67; 349/112
(58) Field of Classification Search .................. 349/65, 349/67, 112
See application file for complete search history.

(56) References Cited

U.S. PATENT DOCUMENTS

| | | | | |
|---|---|---|---|---|
| 6,333,817 | B1 * | 12/2001 | Kashima et al. | 359/599 |
| 6,692,133 | B2 * | 2/2004 | Katsu et al. | 362/620 |
| 7,121,709 | B2 * | 10/2006 | Shinohara et al. | 362/606 |
| 7,360,937 | B2 * | 4/2008 | Han et al. | 362/608 |
| 2002/0141202 | A1 * | 10/2002 | Liu et al. | 362/558 |
| 2003/0137824 | A1 * | 7/2003 | Shinohara et al. | 362/31 |
| 2004/0150317 | A1 * | 8/2004 | Kim et al. | 313/491 |
| 2005/0265046 | A1 * | 12/2005 | Liu | 362/606 |
| 2005/0280752 | A1 * | 12/2005 | Kim et al. | 349/62 |
| 2006/0050200 | A1 * | 3/2006 | Nagao | 349/65 |
| 2006/0072315 | A1 * | 4/2006 | Han et al. | 362/231 |
| 2006/0146227 | A1 * | 7/2006 | Park et al. | 349/64 |
| 2006/0262397 | A1 * | 11/2006 | Lee et al. | 359/486 |
| 2006/0262565 | A1 * | 11/2006 | Shimura | 362/616 |
| 2007/0002586 | A1 * | 1/2007 | Soh et al. | 362/607 |
| 2007/0064417 | A1 * | 3/2007 | Hatanaka et al. | 362/231 |
| 2007/0165422 | A1 * | 7/2007 | Iwasaki | 362/615 |
| 2007/0279549 | A1 * | 12/2007 | Iwasaki | 349/64 |
| 2008/0084520 | A1 * | 4/2008 | Nam et al. | 349/65 |
| 2008/0089091 | A1 * | 4/2008 | Matsushita | 362/603 |

FOREIGN PATENT DOCUMENTS

| | | |
|---|---|---|
| JP | 9-269486 A | 10/1997 |
| JP | 10-247412 A | 9/1998 |
| JP | 2002-075038 A | 3/2002 |
| JP | 2006-133274 A | 5/2006 |

* cited by examiner

*Primary Examiner*—K. Cyrus Kianni
(74) *Attorney, Agent, or Firm*—Lerner, David, Littenberg, Krumholz & Mentlik, LLP

(57) ABSTRACT

A backlight device includes a light guiding plate disposed on a drive substrate directly attached with a light source to confront the light source to guide the light emitted from the light source into the light guiding plate; and a diffusion sheet and a prism sheet superimposed on the light guiding plate, and arranged to refract the light guided into the light guiding plate, and to emit the light from a front surface of the prism sheet. The prism sheet extends toward the light source, and covering above the gap between the light source and the light guiding plate.

2 Claims, 13 Drawing Sheets

TO LIGHT INCIDENT SURFACE OF LIGHT GUIDING PLATE

BACKLIGHT DEVICE, LIQUID CRYSTAL DISPLAY DEVICE, AND ELECTRONIC APPARATUS USING LIQUID CRYSTAL DISPLAY DEVICE

CROSS REFERENCES TO RELATED APPLICATIONS

The present invention contains subject matter related to Japanese Patent Application JP 2006-154529 filed in the Japanese Patent Office on Jun. 2, 2006, the entire contents of which being incorporated herein by reference.

BACKGROUND OF THE INVENTION

This invention relates to a backlight device, a liquid crystal display device arranged to be applied with light to a rear surface of a transmissive liquid crystal display panel by the backlight device, and an electronic apparatus using the liquid crystal display device.

Figure 13:
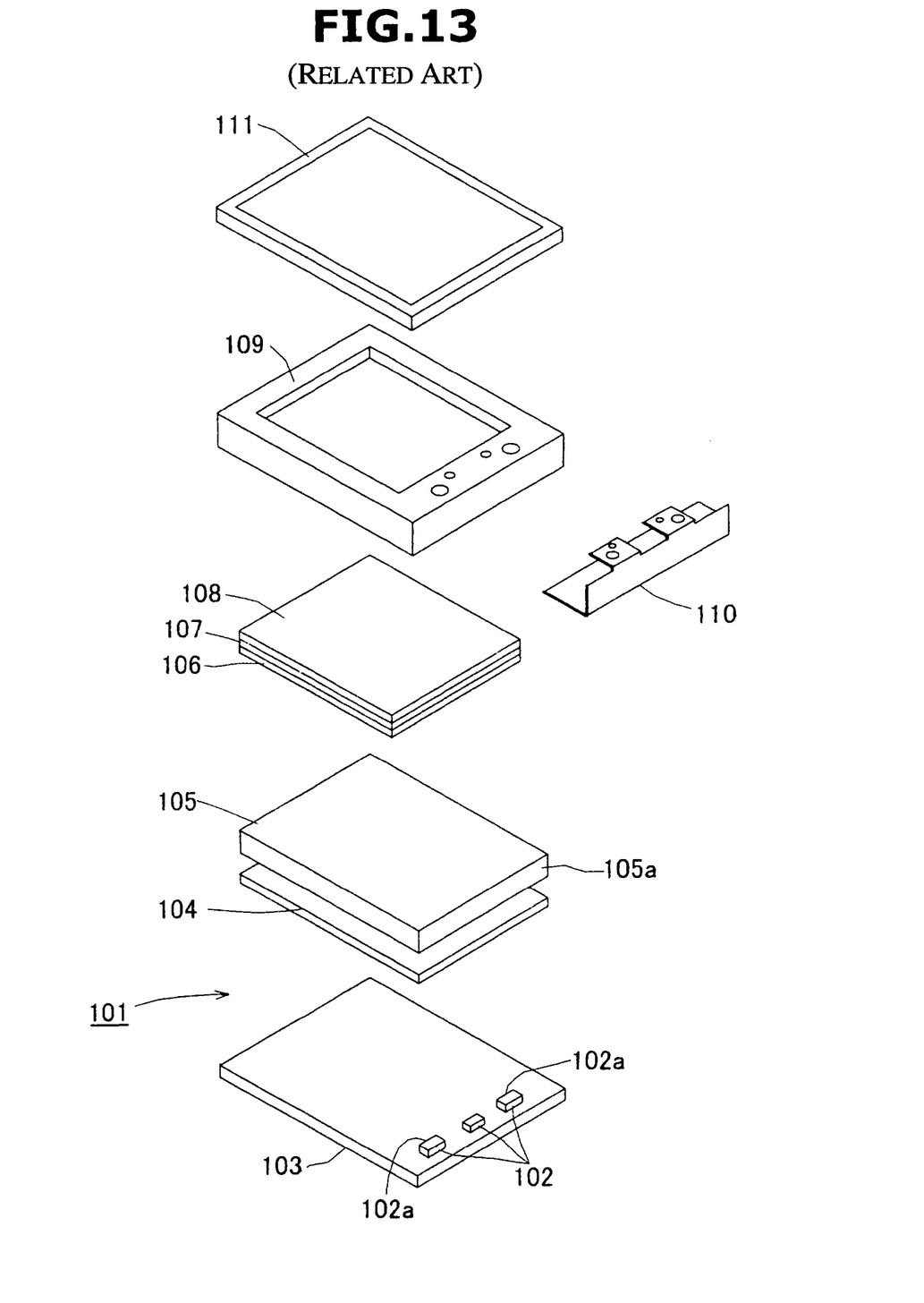
FIG. 13 is a perspective view showing an example of the related art.

For example, a device shown in FIG. 13 is known as a backlight device used in an electronic apparatus such as a mobile phone including a liquid crystal display device. This backlight device 101 includes a drive substrate 103 directly attached with a plurality of light sources 102 such as a white LED (light-emitting diode), a white reflection sheet 104, a light guiding plate 105, a diffusion sheet 106, two prism sheets 107 and 108, and a frame 109.

Within the frame 109, there are received the two prism sheets 107 and 108, the diffusion sheet 106, the light guiding plate 105, and the reflection sheet 104 in this order. Finally, the drive substrate 103 is received within the frame 109, and the frame 109 and the drive substrate 103 are joined by a clip 110, to form the backlight device 101.

Light emitting surfaces 102a of the light sources 102 and a light incident surface 105a of the light guiding plate 105 are disposed to confront each other. The light emitted from the light emitting surfaces 102a of the light sources 102 are guided from the light incident surface 105a into the light guiding plate 105. The light guided into the light guiding plate 105 is refracted by the diffusion sheet 106 and the two prism sheets 107 and 108, and illuminates a rear surface of the liquid crystal display panel 111. (cf. for example, patent document 1)

[patent document 1] Published Japanese Patent Application Publication No. 2002-75038 (paragraph [0013] and so on)

SUMMARY OF THE INVENTION

Figure 14:
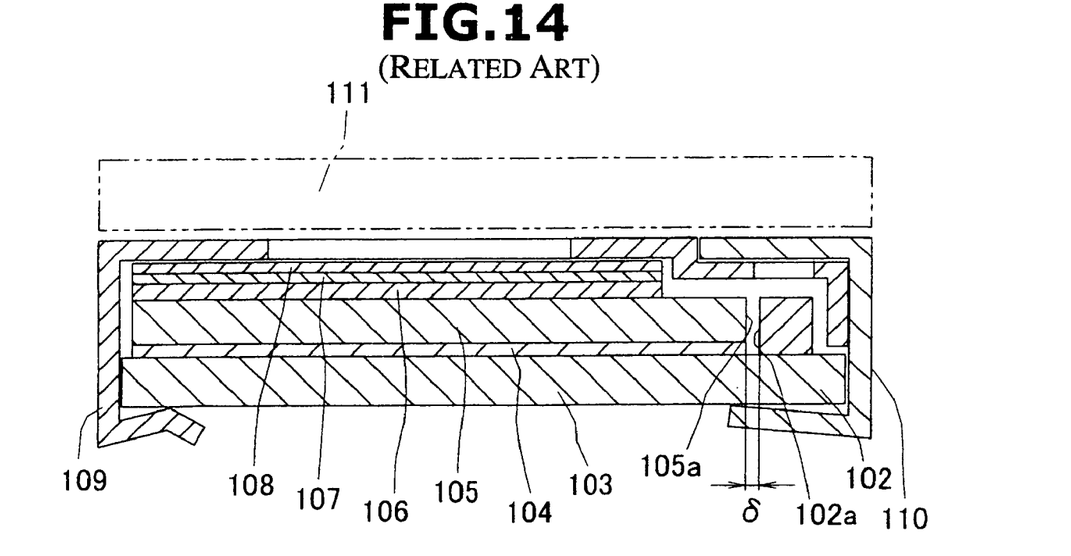
FIG. 14 is a sectional view showing the example of the related art.

By the way, in the above-mentioned backlight device 101 of the related art, the plurality of light sources 102 are directly rigidly joined to the drive substrate 103, and accordingly a gap is inevitably caused between the light sources 102 and the light guiding plate 105 as shown in FIG. 14 by tolerance of mounting accuracy of the light sources 102 to the drive substrate 103, tolerance of processing accuracy of each component, tolerance of accuracy tolerance of the light guiding plate 105 to the frame 109 and so on.

Figure 15:
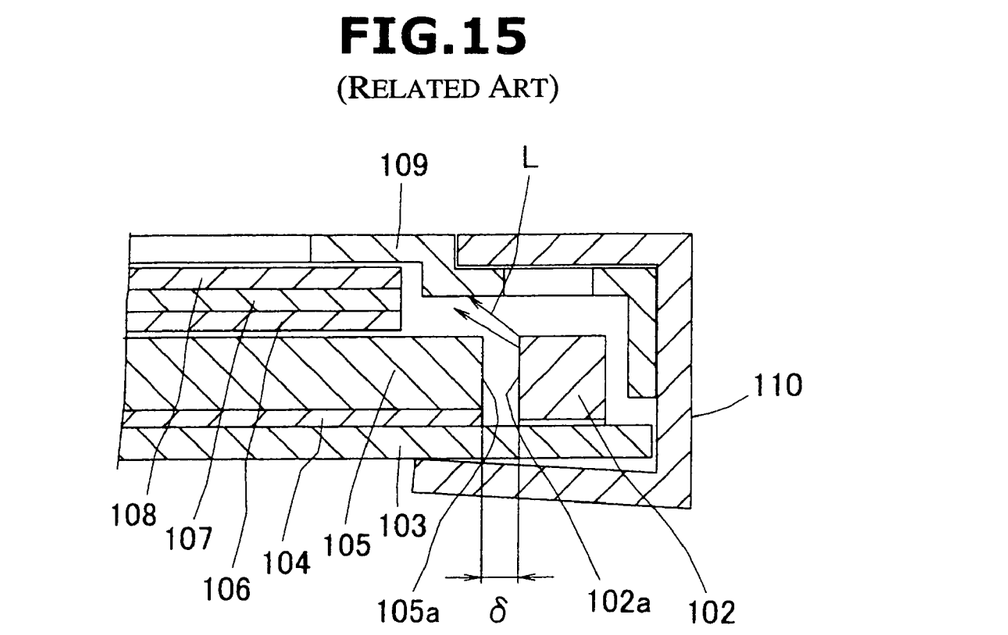
FIG. 15 is an illustrative view showing problems of the example of the related art.

In case of generating the gap δ, as shown in an enlarged view of FIG. 15, a part of the light emitted from the light emitting surfaces 102a of the light sources 102 become leak light L without entering the light incident surface 105a of the light guiding plate 105, and decreases the luminous efficiency of the light sources 102.

Figure 16:
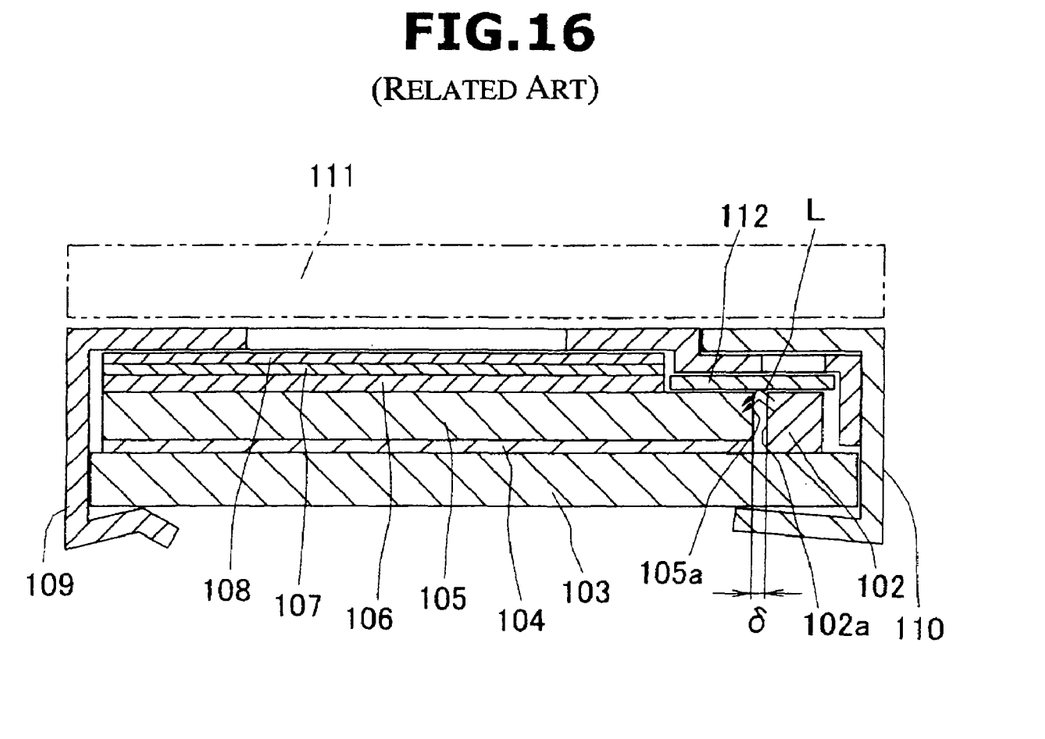
FIG. 16 is a sectional view showing another example of the related art.
Figure 17:
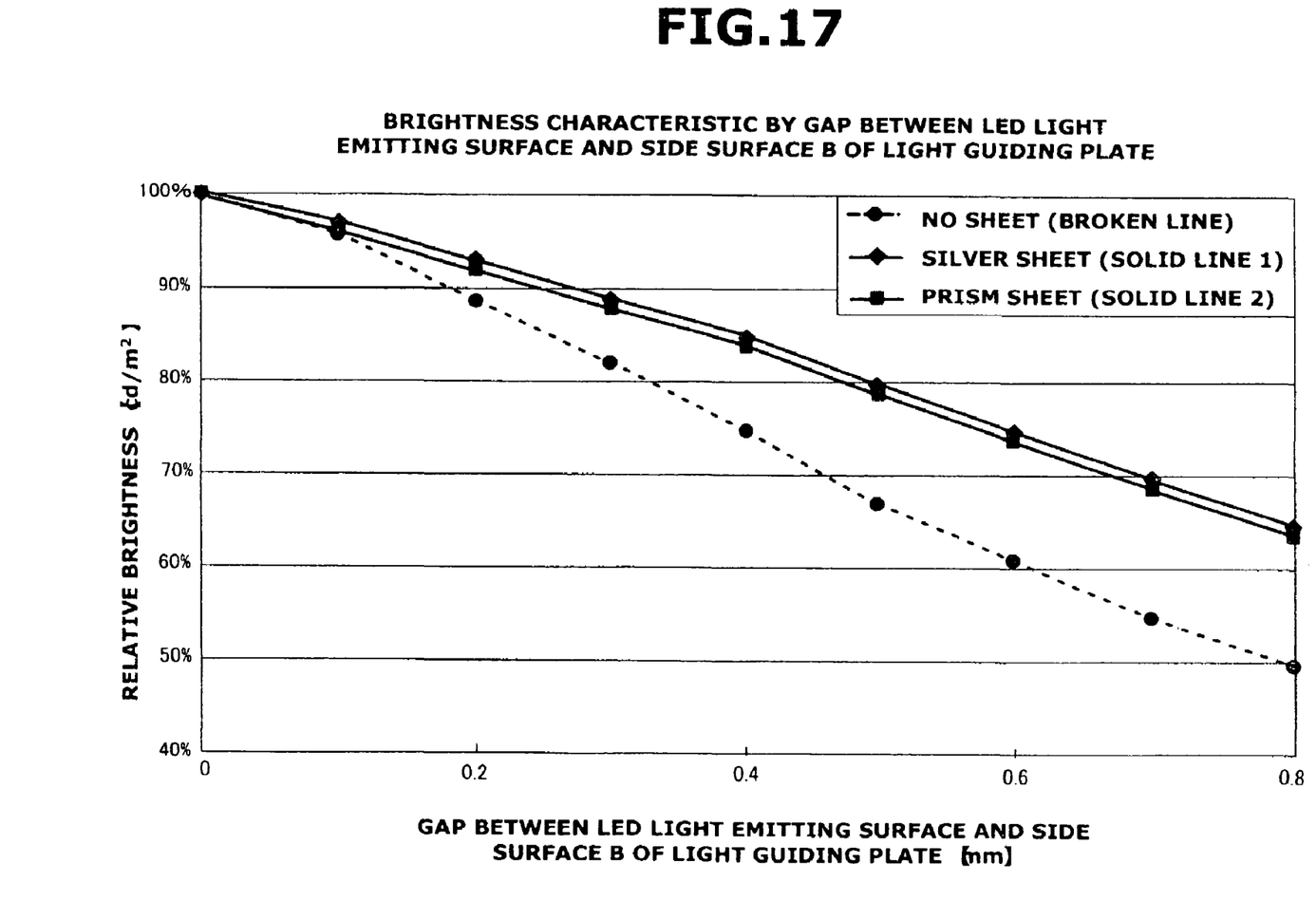
FIG. 17 is a characteristic view showing relationship between brightness and a gap between light emitting surfaces of light sources and a light incident surface of a light guiding plate.

Accordingly, there is developed a backlight device including a silver sheet 112 disposed as a reflection plate above the gap δ, as shown in FIG. 16, for preventing the reduction of the luminous efficiency by the leak light L from the gap δ. This backlight device is arranged to return the leak light L to the light incident surface 105a of the light guiding plate 105 by the silver sheet 112. Incidentally, FIG. 17 shows a relationship between size of the gap δ and brightness of a center portion of the backlight device. A lateral axis represents the gap δ, and a vertical axis represents the brightness of the center portion of the backlight device. A solid line 1 represents a case that the silver sheet 112 is disposed, and a broken line represents a case that the silver sheet 112 is not disposed. In the case of the solid line and the broken line, the brightness of the central portion of the backlight device is decreased as the gap δ is increased. In the case that the silver sheet 112 is disposed, the brightness reduction is smaller than the brightness reduction in the case of the silver sheet 112 is not disposed. Besides, a solid line 2 represents an effect in a case in which a prism sheet according to the present invention is used as the reflection plate.

As mentioned above, the silver sheet 112 is disposed as the reflections sheet, above the gap δ, and the leak light is returned to the light incident surface 105a of the light guiding plate 105 by the silver sheet 112. This improves the luminous efficiency of the light sources 102. However, the number of the components is increased since the silver sheet 112 is used, and accordingly the man-hour of the assembly of the silver sheet 112 is increased. Therefore, this runs counter to need of simplification of the structure of the backlight device. Therefore, in this backlight device, it is problematic to return the leak light to the light incident surface side of the light guiding plate without increasing the number of the components and the man-hour of the assembly.

It is desirable to provide a backlight device arranged to return a leak light to a light incident surface side of a light guiding plate, without increasing the number of components and the man-hour of assembly, that is, without using a silver sheet.

A backlight device according to an embodiment of the resent invention includes a light guiding plate disposed on a drive substrate directly attached with a light source to confront the light source to guide the light emitted from the light source into the light guiding plate; and a diffusion sheet and a prism sheet superimposed on the light guiding plate, and arranged to refract the light guided into the light guiding plate, and to emit the light from a front surface of the prism sheet. The prism sheet extends toward the light source, and covering above the gap between the light source and the light guiding plate.

The prism sheet extends to the light sources side, and covers above the gap located between the light source and the light guiding plate. Accordingly, the leak light generating in the gap is reflected by the prism sheet, and returned to the light incident surface side of the light guiding plate. Consequently, it is possible to improve the luminous efficiency of the light sources, like the case of the related art that the silver sheet is disposed. In particular, the present invention makes it possible to attain the same effect as the case that the silver sheet is disposed, by the simple structure that the prism sheet extends above the gap.

DETAILED DESCRIPTION OF THE INVENTION

Figure 1:
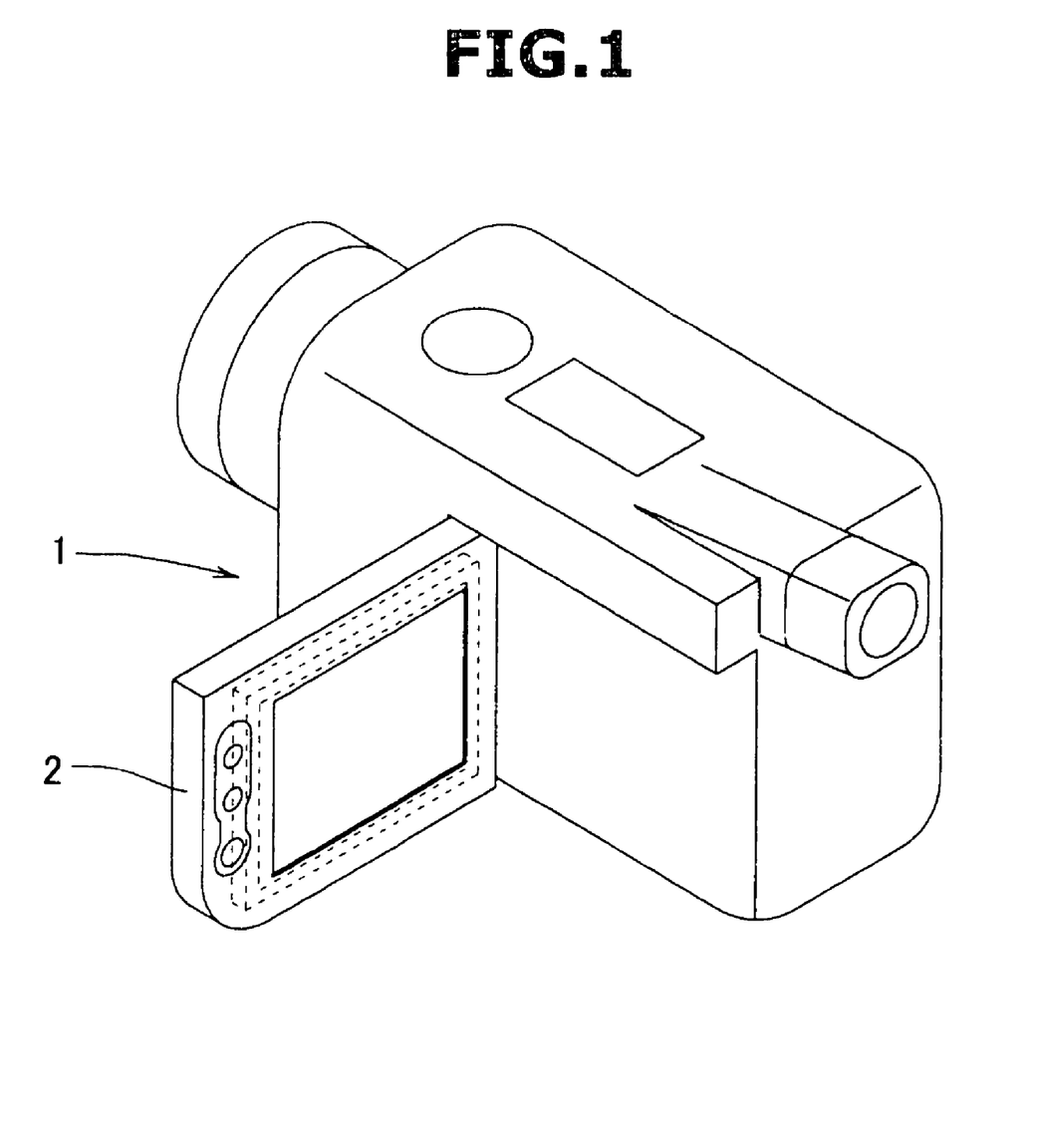
FIG. 1 is a perspective view showing an electronic apparatus.

Hereinafter, the present invention will be illustrated with reference to the drawings. FIG. 1 is a perspective view showing a digital camcorder serving as an electronic apparatus 1. The electronic apparatus 1 is equipped with a liquid crystal display device 2.

Figure 2:
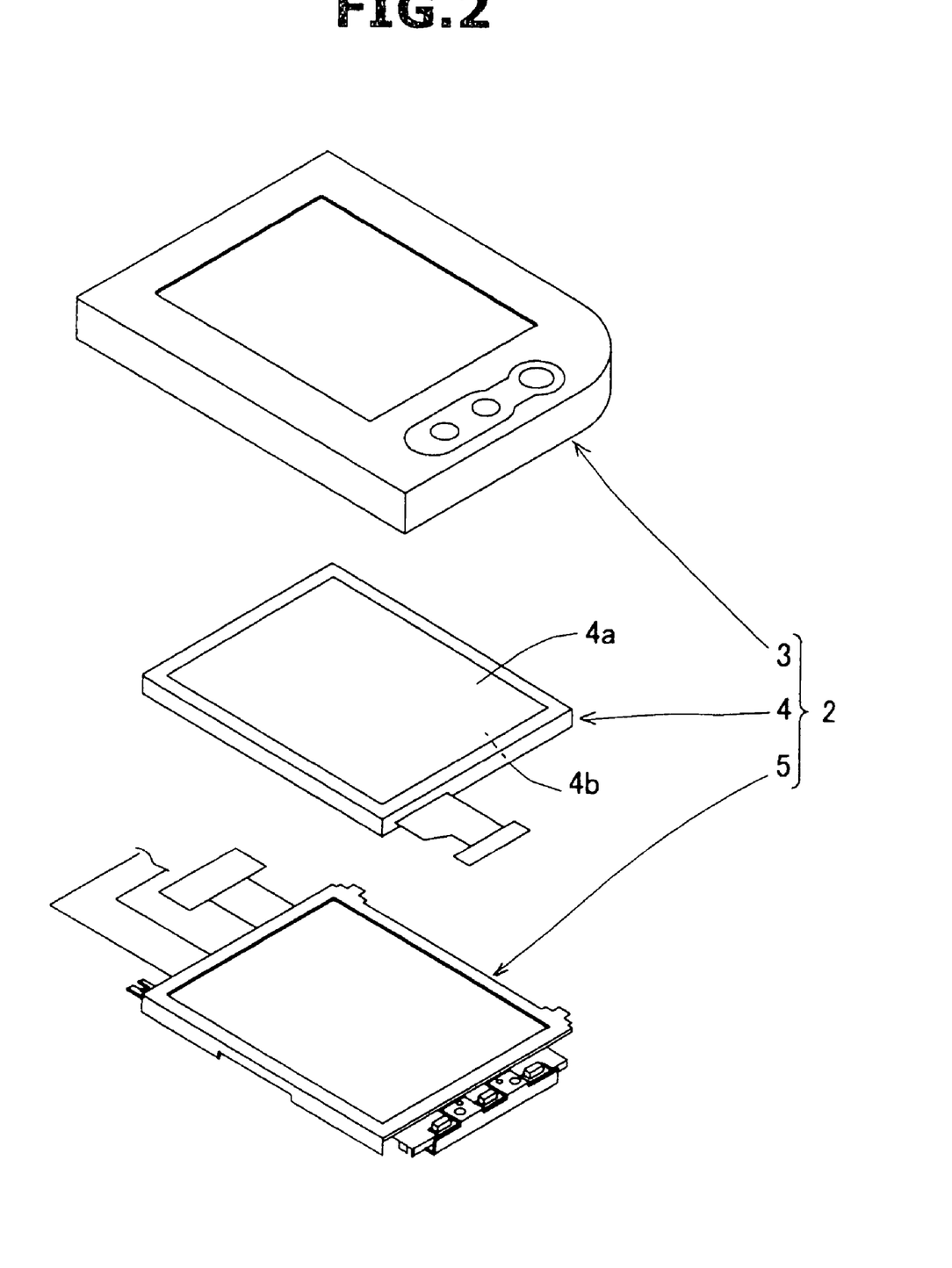
FIG. 2 is an exploded perspective view of a liquid crystal display device.

FIG. 2 is an exploded perspective view of the liquid crystal display device 2. The liquid crystal display device includes a case 3, a liquid crystal display panel 4 received in the case 3, and a backlight device arranged to provide a light to a rear surface of the liquid crystal display panel 4.

The liquid crystal display panel 4 includes a display surface 4a arranged to display images, and a rear surface 4b opposite to display surface 4a. The rear surface 4b is illuminated by the backlight device 5, and the light is penetrated to display the images on the display surface 4a, so that the liquid crystal display panel 4 is a transmissive liquid crystal display device.

Figure 3:
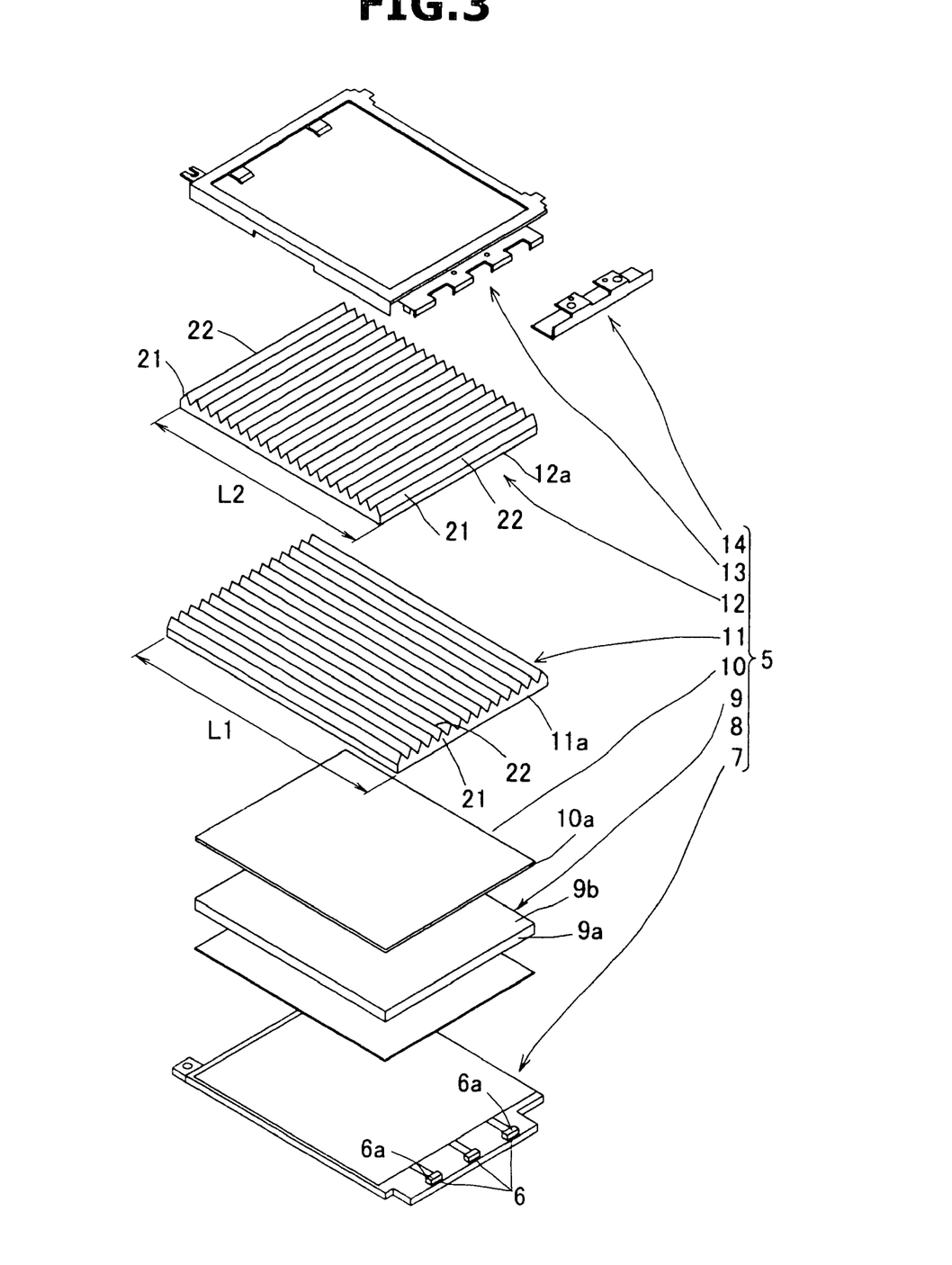
FIG. 3 is an exploded perspective view of a backlight device.

FIG. 3 is an exploded perspective view showing the backlight device 5. The backlight device 5 includes a drive substrate 7 on which a plurality of light sources 6 are directly attached; a light guiding plate 9 disposed through a reflecting sheet 8 on an upper surface side of the drive substrate 7; a diffusion sheet 10 disposed on an upper surface side of the light guiding plate 9; first and second prism sheet 11 and 12 disposed on an upper surface side of the diffusion sheet 10; a frame 13; and a clip 14 retaining the first and second prism sheets 11 and 12, the diffusion sheet 10, the light guiding plate 9, the reflecting sheet 8, and the drive substrate 7 which are received within the frame 13.

Figure 4:
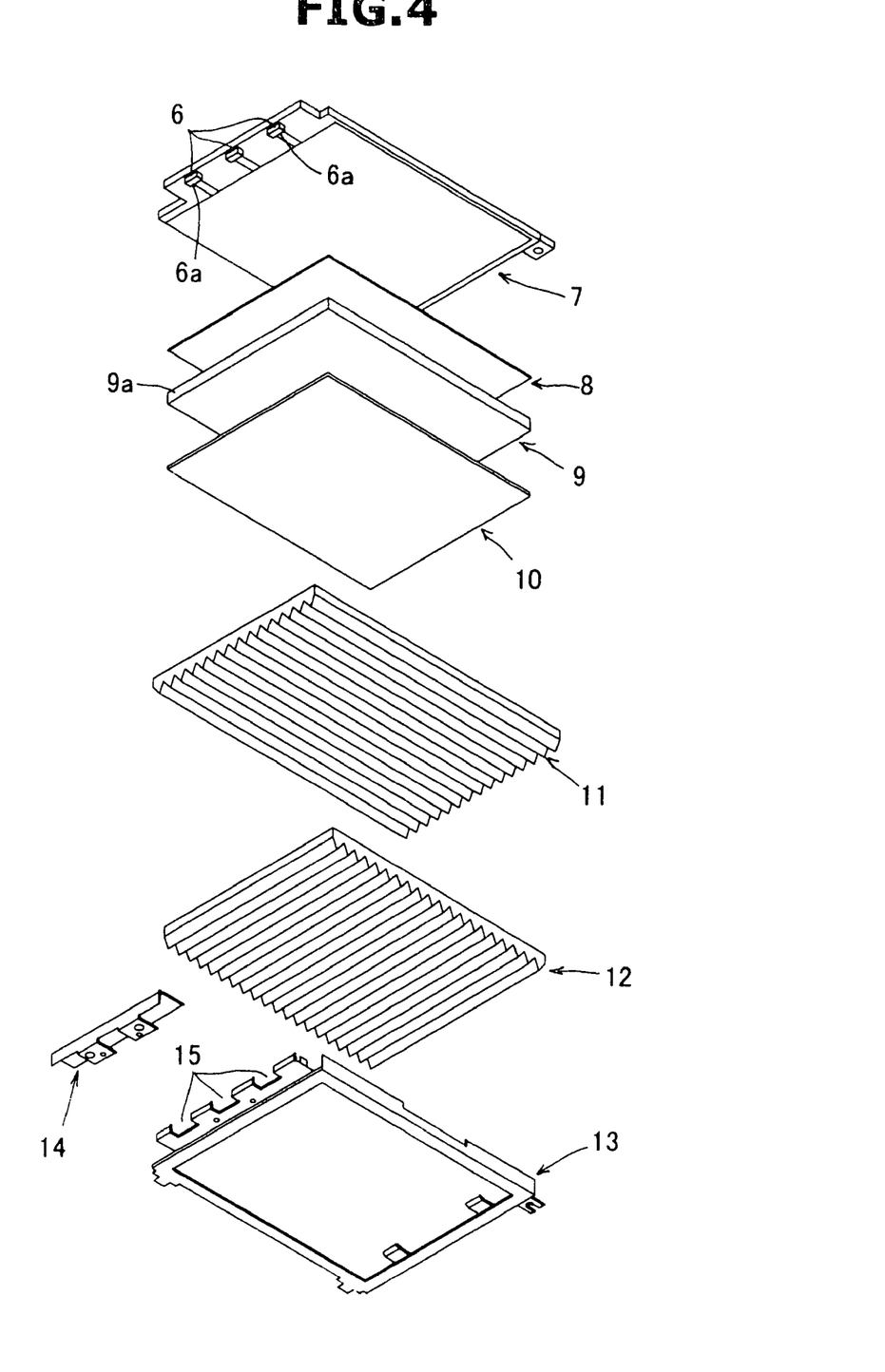
FIG. 4 is a view showing an assembly process of the backlight device.
Figure 5:
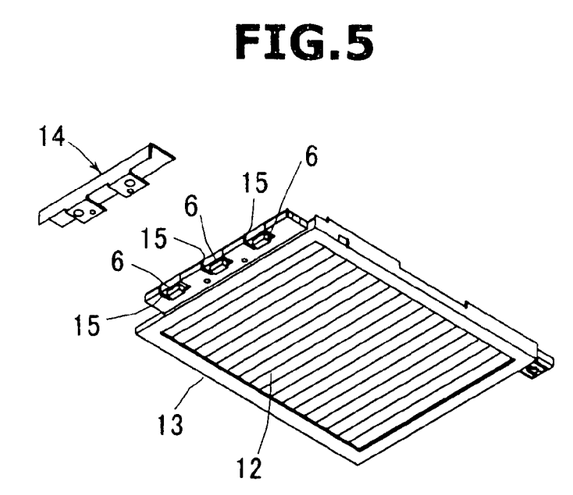
FIG. 5 is a view showing an assembly process of the backlight device.

As shown in FIGS. 4 and 5, the second prism sheet 12, the first prism sheet 1, the diffusion sheet 10, the light guiding plate 9, the reflecting sheet 10, the reflecting sheet 8, and the drive substrate 7 are stacked, in this order, within the frame 13. The plurality of the light sources 6 provided on the drive substrate 7 are inserted in light source receiving portions 15 provided on one side of the frame 13, to confront the light emitting surface 6a of the light sources 6 and the light incident surface 9a of the light guiding plate 9, and these are sandwiched by clip 14. Consequently, the drive substrate 7, the reflecting sheet 8, the light guiding plate 9, the diffusion sheet 10, the first and second prism sheets 11 and 12, and the frame 13 are integrated (united), to form the backlight device 5.

Figure 6:
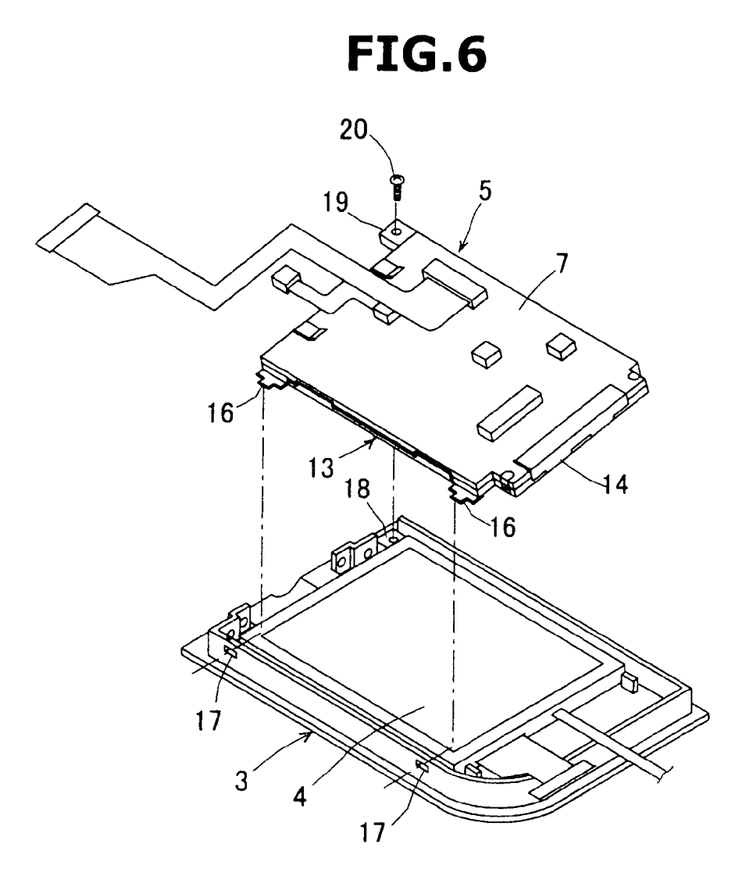
FIG. 6 is an illustrative view showing an assembly operation of the backlight device to a case.

FIG. 6 is an exploded perspective view showing the assembly operation of the liquid crystal display device 2. At the assembly operation, at first, the liquid crystal display panel 4 is assembled in the case 3. Next, the backlight device 5 is assembled to be superimposed on the liquid crystal display panel 4. At the assembly operation of the backlight device 5, a pair of engagement protrusions 16 protruding from one side of the frame 13 of the backlight device 5 are mounted in a pair of engagement holes 17 provided in one side surface of the case 3 for positioning, and the backlight device 5 is superimposed on the liquid crystal display panel 4. Consequently, a screw joining portion 18 provided in the case 3 and a screw joining portion 19 provided in the drive substrate 7 are superimposed with each other. These screw joining portions 18 and 19 are joined with a screw 20, and the backlight device 5 is positioned and fixed to the case 3.

Figure 7:
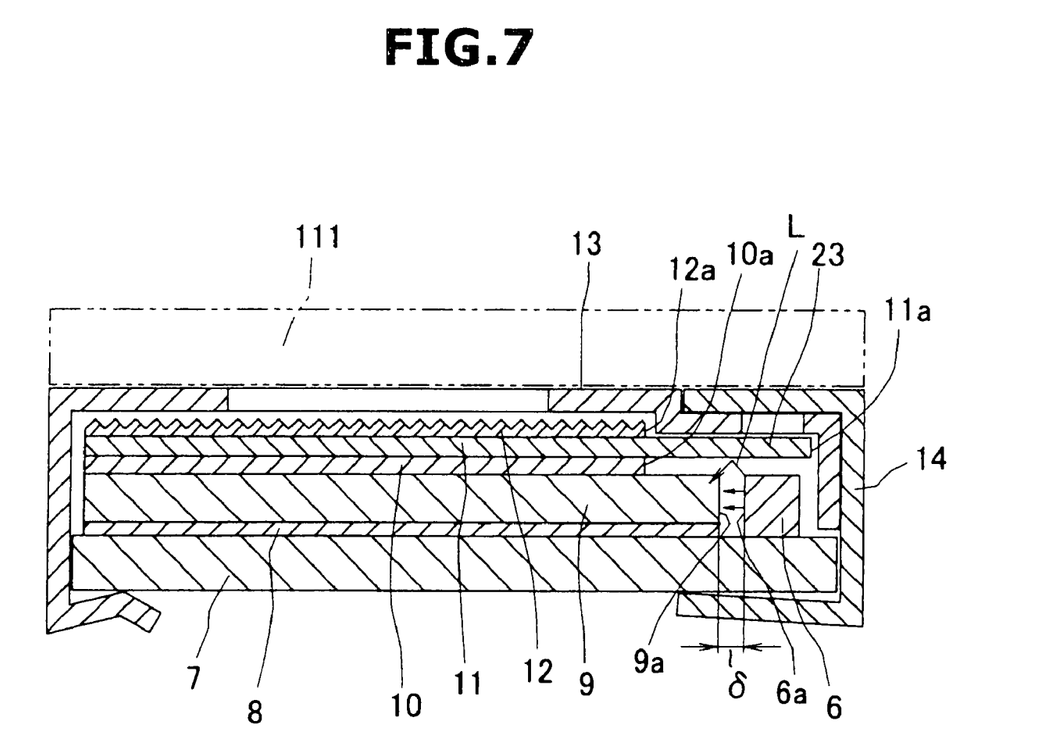
FIG. 7 is a sectional view showing a main part of the backlight device.

FIG. 7 is a sectional view showing a main part of the backlight device 5. Between the light emitting surfaces 6a of the light sources 6 and the light incident surface 9a of the light guiding plate 9, there is the gap δ. This gap δ is needed to eliminate the tolerance of the mounting accuracy or the tolerance of the processing accuracy of each component and so on which is generated when the light sources 6 are rigidly directly attached on the drive substrate 7, and to assemble to confront the light emitting surface 6a of the light sources 6 and the light incident surface 9a of the light guiding plate 9. An extension portion 23 of the first prism sheet 1 covers above the gap δ, and the leak light from the light sources 6 is reflected and returned to the light incident surface 9a of the light guiding plate 9.

Next, the light sources 6, the drive substrate 7, the reflecting sheet 8, and the light guiding plate 9 and so on which form the backlight device 5 will be briefly illustrated with reference to FIG. 3 and so on.

Each of the light sources 6 is formed as a rectangular tip component including a plurality of white light emitting diodes (LED). The light sources 6 are mounted to protrude on the upper surface side of the drive substrate 7.

The light sources 6 are mounted on an upper surface side of the drive substrate 7, and a light source driving circuit and so on are mounted on a lower surface of the drive substrate 7. The drive substrate 7 is made from glass epoxy resin and so on.

The reflecting sheet 8 is formed of a white resin sheet having a high reflection efficiency.

The light guiding plate 9 diffuses the light of the light sources 6 entered from the light incident surface 9a within the light guiding plate 9, and emits as the light from a light radiating surface 9b by reflecting by the reflection sheet 8. The light guiding plate 9 is formed of transparent acryl resin and so on.

The diffusion sheet 10 is arranged to diffuse the light from the light guiding plate 9. The diffusion sheet 10 is formed by dispersing and mixing, into base material of transparent acryl resin, transparent minute particles a refractive index different from a refractive index of the base material. The diffusion sheet 10 is arranged to diffuse the light from the light emitting surface 9b of the light guiding plate 9 mainly in the forward direction (the upward direction of FIG. 3), that is to diffuse toward the first and second prism sheets 11 and 12.

Each of the first and second prism sheets 11 and 12 is provided with many saw-toothed protrusions 21 located on the surface located on a surface thereof, each having substantially triangular section, and arranged in parallel with each other.

The first prism sheet 11 is disposed on the diffusion sheet 10 so that ridgelines (top portions) 22 of the protrusions 21 having the substantially triangular section extend perpendicular to the light emitting surfaces 6a of the light sources 6.

The second prism sheet 12 is disposed on the prism sheet 11 so that ridgelines (top portions) 22 of protrusions 21 having the substantially triangular section extends in a direction parallel to the light emitting surface 6a of the light sources 6.

A length L1 of the first prism sheet 11 is set longer than a length L2 of the second prism sheet and the diffusion sheet 10. As shown in FIG. 7, a first end portion 11a of the first prism sheet 11 extends toward the light sources 6 beyond a first end portion 12a of the second prism sheet 12 and a first end portion 10a of the diffusion sheet 10, and the extension portion 23 covers the gap δ.

Next, operation of the backlight device 5 will be illustrated. As shown in FIG. 7, the light L from the light emitting surfaces 6a of the light sources 6 is emitted from the light incident surface 9a into the light guiding plate 9. As described above, between the light emitting surfaces 6a of the light sources 6 and the incident surface 9a of the light guiding plate 9, there is the gap δ. Accordingly, a part of the light emitted from the light sources 6 is emitted, as the leak light L, to an obliquely upper position out of above the light incident surface 9a. However, as mentioned above, the extension portion 23 of the first prism sheet 11 covers above the gap δ. Accordingly, the leak light L is reflected by the extension portion 23 of the first prism sheet 11, and enters the light incident surface 9a of the light guiding plate 9. Consequently, as shown by the solid line 2 in FIG. 17, the reduction of the luminous efficiency of the light sources 6 by the leak light is restrained by the substantially same effect as the case of the solid line 1 that the silver sheet of the related art is used as shown by the solid line 2 in FIG. 17.

Figure 8A:
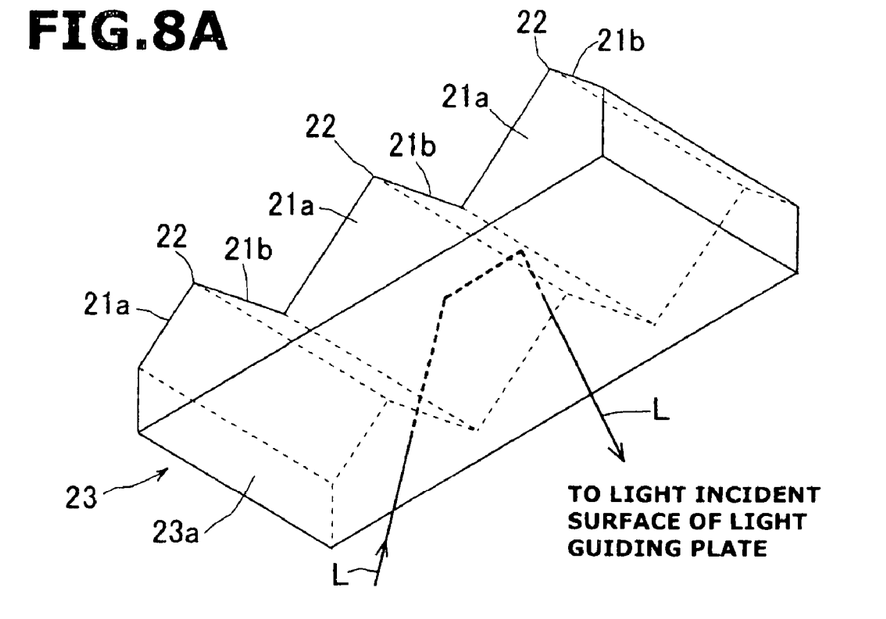
FIG. 8A is a perspective view showing function of a first prism sheet.
Figure 8B:
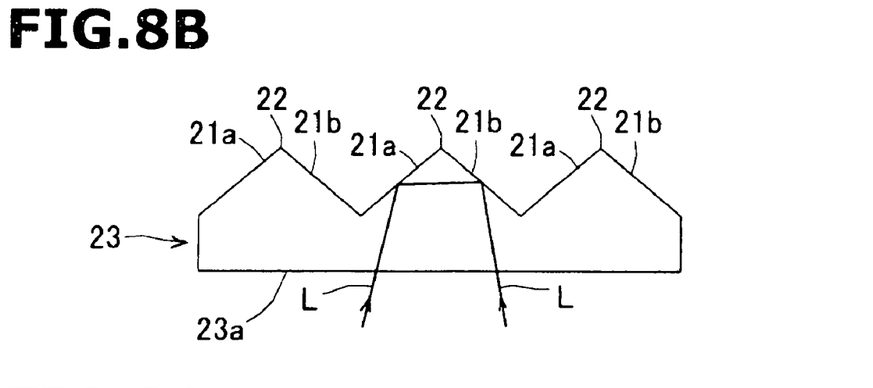
FIG. 8B is a plane view of FIG. 8A.
Figure 8C:
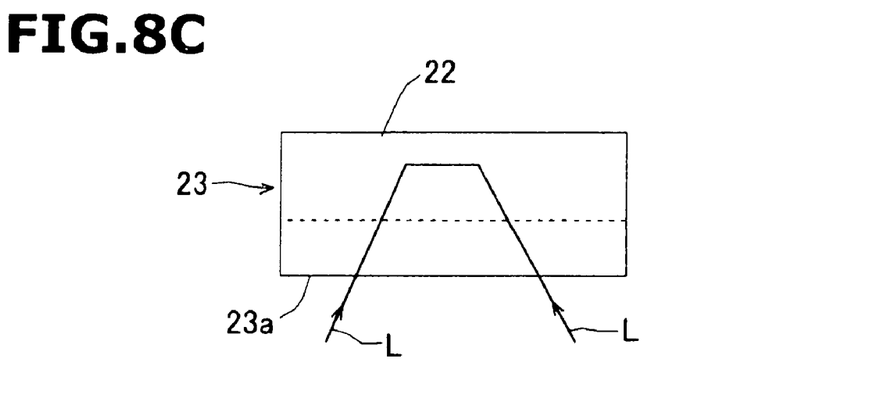
FIG. 8C is a side view of FIG. 8A.

In particular, the first prism sheet 11 is disposed so that the ridgelines 22 of the protrusions having the substantially triangular section extend in the substantially right angle direction (the substantially perpendicular direction) toward the light emitting surface 6a of the light sources 6 for the backlight. As shown in FIG. 8, the leak light entered from the lower surface 23a of the extension portion 23 into the prism sheet 11 is reflected by inner surfaces of first inclined surfaces 21a and inner surfaces o second inclined surface 21b of protrusions 21 having the substantially triangular section, and accordingly it is possible to effectively enter the light incident surface 9a of the light guiding plate 9. The first prism sheet 11 of the two superimposed prism sheets is located near the light guiding plate 9, and provided with the extension portion 23. Accordingly, it is possible to enhance the reflection efficiency, relative to the case the leak light is reflected by providing the extension portion 23 to the second prism sheet 12 located at a position farther to the light guiding plate 9.

Figure 9:
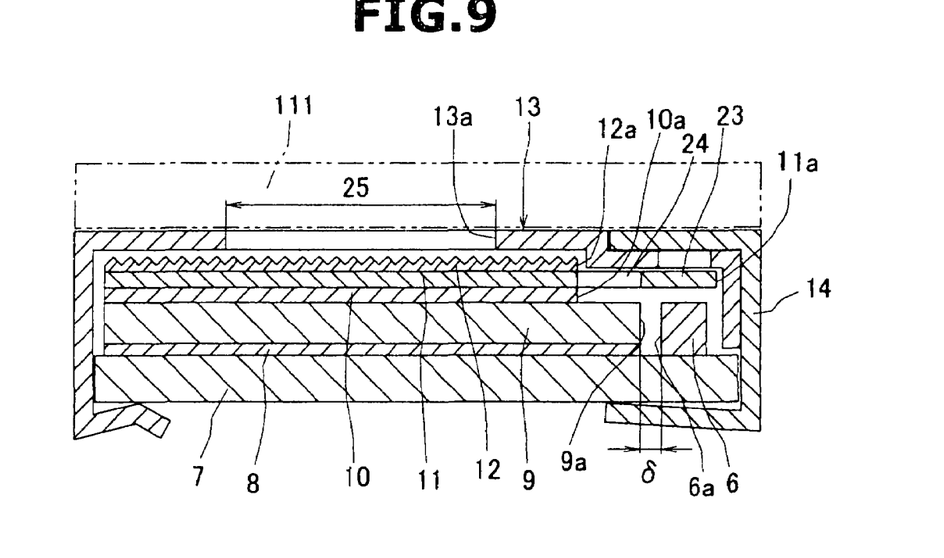
FIG. 9 is a sectional view showing a backlight device according to another embodiment.

FIG. 9 shows another embodiment of backlight device 5. In this embodiment, the first prism sheet 11 is formed with slits (cutaway openings) 24 to divide the plurality of protrusions 21 having the substantially triangular section. The slits 24 are provided at a position on a center side of a position just above the gap between the light source 6 and the light guiding plate 9, and outside a window frame 13a of the frame 13 which is a uniform light emitting area 25 of the backlight device 5.

Figure 10:
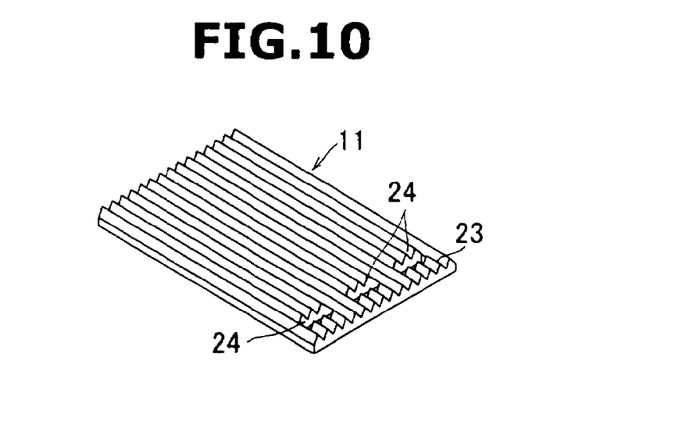
FIG. 10 is a perspective view of a prism sheet according to another example.
Figure 11:
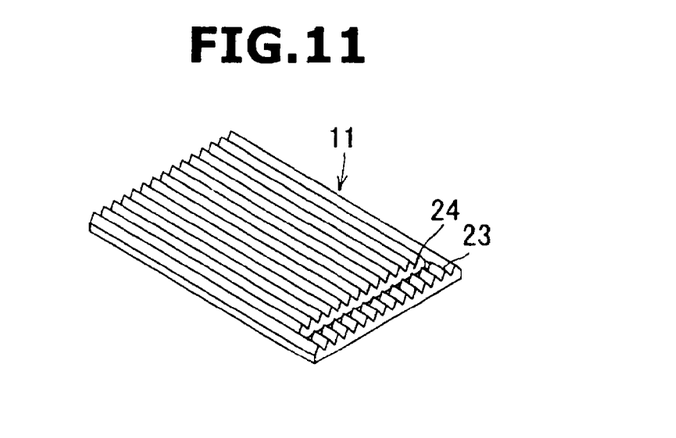
FIG. 11 is a perspective view of a prism sheet according to another example.
Figure 12:
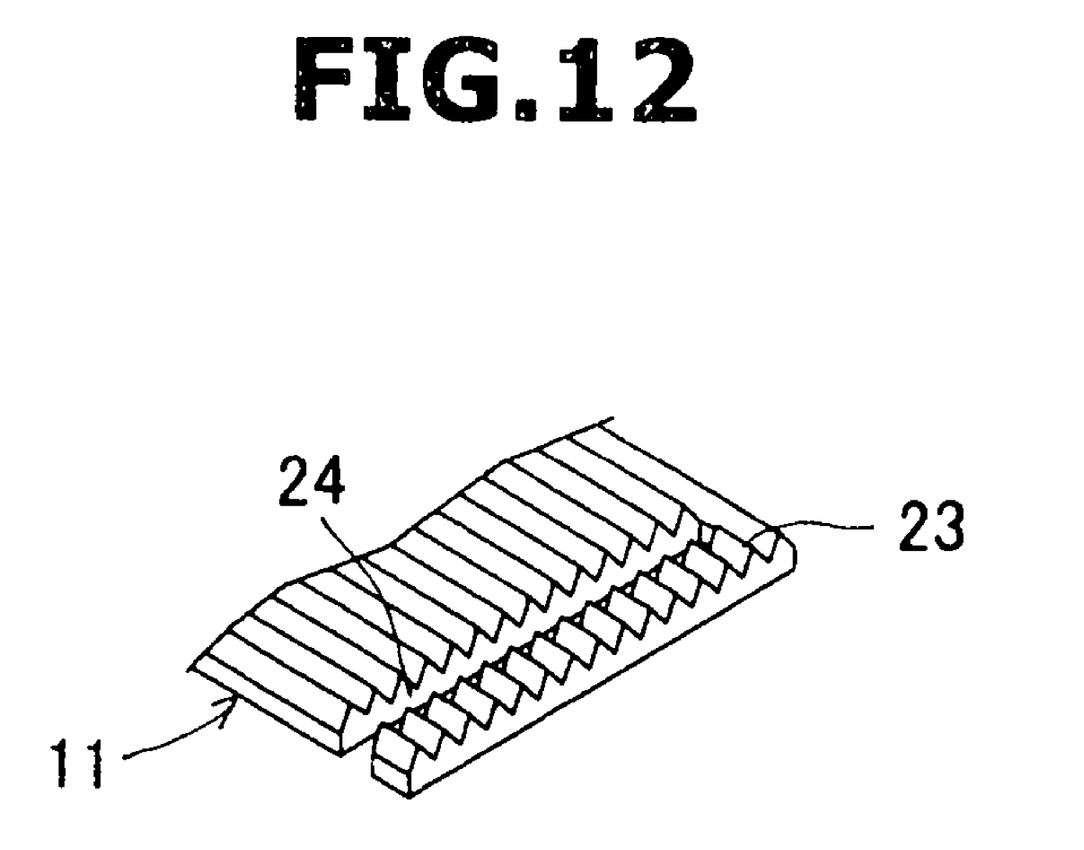
FIG. 12 is a partially cutaway perspective view showing a prism sheet according to another example.

The slit 24 are provided to prevent generation of band-shaped emission lines caused by movement of the part of the leak light entered into the extension portion 23 which is not reflected by the light emitting surfaces 6a of the light sources 6, within the protrusion 21 along the longitudinal direction of the protrusions 21. It is optional to form the slit 24 by a plurality of holes as shown in FIG. 10, or to form by an elongated hole as shown in FIG. 11. Moreover, as shown in FIG. 12, it is optional to form slit 24 to delete one end portion of the elongated hole for facilitating to form the slit 24. The other structures are identical to the base embodiment, and overlapping illustrations are omitted. In the above-described embodiments, the digital camcorder is illustrated as the electronic apparatus 1 equipped with the liquid crystal display device 2. However, the electronic apparatus may be various electronic apparatus such as a digital still camera, a cell-phone, a game console, or an electronic dictionary.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight device comprising:
   a light guiding plate disposed on a drive substrate directly attached with a light source arranged such that light from the light source is emitted into the light guiding plate; and
   a diffusion sheet and a prism sheet superimposed on the light guiding plate, and arranged to refract the light emitted into the light guiding plate, and to emit the light from a front surface of the prism sheet,
   the prism sheet extending toward the light source, and covering above a gap between the light source and the light guiding plate,
   wherein the prism sheet includes a plurality of substantially triangular protrusions disposed on a surface of the prism sheet to extend parallel to each other, and each having a saw-toothed section; the prism sheet includes a first prism sheet disposed so that ridgelines of the protrusions having the substantially triangular section extend substantially perpendicular to the light emitting surface of the light source, and a second prism sheet disposed so that ridgelines of the protrusions having the substantially triangular section extend substantially parallel to the light emitting surface of the light source; and the first prism sheet covers above the gap between the light source and the light guiding plate,
   wherein the first prism sheet is provided with a slit located at a position on a center side of a position just above the gap between the light source and the light guiding plate, and the slit of the first prism sheet extends across the plurality of the protrusions having the substantially triangular section.

2. The backlight device as claimed in claim 1, wherein the first prism sheet is disposed nearer to the light guiding plate than the second prism sheet.

* * * * *